United States Patent [19]

Balachandran et al.

[11] Patent Number: 6,108,374
[45] Date of Patent: Aug. 22, 2000

[54] SYSTEM AND METHOD FOR MEASURING CHANNEL QUALITY INFORMATION

[75] Inventors: Krishna Balachandran, Middletown; Sanjiv Nanda, Plainsboro; Srinivas R. Kadaba, Chatham, all of N.J.; Richard P. Ejzak, Wheaton, Ill.

[73] Assignee: Lucent Technologies, Inc., Murray Hill, N.J.

[21] Appl. No.: 08/921,454

[22] Filed: Aug. 25, 1997

[51] Int. Cl.$^7$ .............................. H04B 17/00; H04B 3/46; H04Q 1/20
[52] U.S. Cl. .......................................... 375/227; 455/226.3
[58] Field of Search ..................................... 375/227, 221, 375/225, 222, 316, 377; 455/226.3

[56] References Cited

U.S. PATENT DOCUMENTS

| | | |
|---|---|---|
| 5,285,478 | 2/1994 | Wornell et al. ........................ 375/259 |
| 5,541,955 | 7/1996 | Jacobsmeyer .......................... 375/222 |
| 5,623,484 | 4/1997 | Muszynski .............................. 370/335 |
| 5,809,086 | 9/1998 | Ariyavisitakul ........................ 375/332 |

*Primary Examiner*—Don N. Vo
*Assistant Examiner*—Phuong Phu
*Attorney, Agent, or Firm*—Wildman, Harrold, Allen & Dixon; Carmen B. Patti

[57] ABSTRACT

A system and method to measure channel quality in terms of signal to noise ratio for the transmission of coded signals over fading channels. A Viterbi decoder metric for the Maximum Likelihood path is used as a channel quality measure. This Euclidean distance metric is filtered in order to smooth out short term variations. The filtered or averaged metric is a reliable channel quality measure which remains consistent across different coded modulation schemes and at different mobile speeds. The filtered metric is mapped to the signal to noise ratio per symbol using a threshold based scheme. Use of this implicit signal to noise ratio estimate is used for the mobile assisted handoff and data rate adaptation in the transmitter.

39 Claims, 9 Drawing Sheets

| CURRENT SCHEME | CONDITIONS ON METRIC | NEW SCHEME |
|---|---|---|
| $C_1$ | $M_i/\mu_2 < \theta_{low}$ | $C_2$ |
| $C_2$ | $M_i/\mu_3 > \theta_{high}$ | $C_1$ |
| | $M_i/\mu_3 < \theta_{low}$ | $C_3$ |
| $C_3$ | $M_i/\mu_3 > \theta_{high}$ | $C_2$ |

| CURRENT SCHEME | CONDITIONS ON METRIC | NEW SCHEME |
|---|---|---|
| $C_1$ | $M_i/\mu_3 < \theta_{low}$ | $C_3$ |
| $C_2$ | $M_i/\mu_2 > \theta_{high}$ | $C_1$ |
|  | $M_i/\mu_3 < \theta_{low}$ | $C_3$ |
| $C_3$ | $M_i/\mu_3 > \theta_{high}$ | $C_2$ |

SYSTEM AND METHOD FOR MEASURING CHANNEL QUALITY INFORMATION

BACKGROUND OF THE INVENTION

1. Field of the Invention

The present invention relates generally to the field of communication systems and, more particularly, to communications systems which measure the quality of channel information.

2. Description of the Related Art

As the use of wireless communications continues to grow worldwide at a rapid pace, the need for frequency spectrum efficient systems that accommodate both the expanding number of individual users and the new digital features and services such as facsimile, data transmission, and various call handling features has increased.

Current wireless data systems such as the cellular digital packet data (CDPD) system and the IS-130 circuit switched time division multiple access data system support only low fixed data rates which are insufficient for several applications. Because cellular systems are engineered to provide coverage at the cell boundary, the signal to interference plus noise ratio (SINR) over a large portion of a cell is sufficient to support higher data rates. Adaptive data rate schemes using bandwidth efficient coded modulation are currently proposed for increasing data throughput over the fading channels encountered in cellular systems. Increased data throughput is accomplished by using bandwidth efficient coded modulation schemes with higher information rates. However, a practical problem to using these schemes is to dynamically adjust the coded modulation to adapt to the channel conditions.

At present, there is a need to determine the channel quality based on the measurements or metrics of the SINR or the achievable frame error rate (FER) for the time varying channel. However, in cellular systems there is no fast accurate method to measure either the SINR or to estimate the FER.

The difficulty in obtaining these metrics in a cellular system is due to the time varying signal strength levels found on the cellular channel. The time varying signal strength levels, sometimes referred to as fading, are the result of the movement of the mobile station or cellular phone relative to the base station (also known as a cell site). Recent schemes propose a short term prediction of the FER, but not the SINR, using the metric for the second best path by a Viterbi decoder. This metric is computationally very intensive and reacts to short term variations in fading conditions. Therefore, there is a need, in the field of wireless communication systems, for a method accurately measuring the channel quality in terms of the SINR.

It is also important to measure channel quality, in terms of SINR or FER, for the purpose of mobile assisted handoff (MAHO). However, FER measurements are usually very slow for the purpose of handoff or rate adaptation. FER as a channel quality metric is slow because it can take a very long time for the mobile to count a sufficient number of frame errors. Therefore, there is a need for a robust short term channel quality indicator that can be related to the FER.

As a result, channel quality metrics such as symbol error rate, average bit error rate and received signal strength measurements have been proposed as alternatives. The IS-136 standard already specifies measurement procedures for both bit error rate and received signal strength. However, these measures do not correlate well with the FER, or the SINR, which is widely accepted as the meaningful performance measure in wireless systems. Also, received signal strength measurements are often inaccurate and unreliable. The present invention is directed to overcoming, or at least reducing the effects of one or more of the problems set forth above.

SUMMARY OF THE INVENTION

In accordance with one aspect of the present invention there is provided a system and method for determining the signal to interference plus noise ratio which provides for establishing a set of path metrics corresponding to a set of predetermined signal to interference plus noise ratios. A digital signal is received and a path metric determined for the digital signal. Mapping of the path metric is provided to a corresponding to interference plus noise ratio the set of predetermined signal to interference plus noise ratios.

These and other features and advantages of the present invention will become apparent from the following detailed description, the accompanying drawings and the appended claims.

BRIEF DESCRIPTION OF THE DRAWINGS

The advantages of this invention will become apparent upon reading the following detailed description and upon reference to the drawings in which.

DETAILED DESCRIPTION

Figure 1:
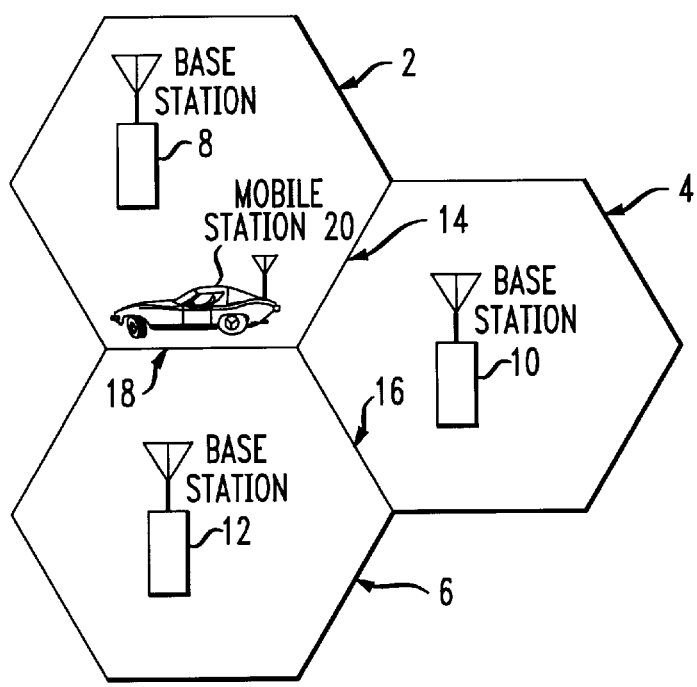
FIG. 1 is a graphical representation of three cell sites within a cluster.

Referring to the drawings and initially to FIG. 1, a plurality of cells 2, 4, and 6 in a telecommunications system are shown. Consistent with convention, each cell 2, 4, and 6 is shown having a hexagonal cell boundary. Within each cell 2, 4, and 6 are base stations 8, 10, and 12 that are located near the center of the corresponding cell 2, 4, and 6. Specifically, the base station 8 is located within cell 2, base station 10 is located within cell 4, and base station 12 is located within cell 6.

Figure 2:
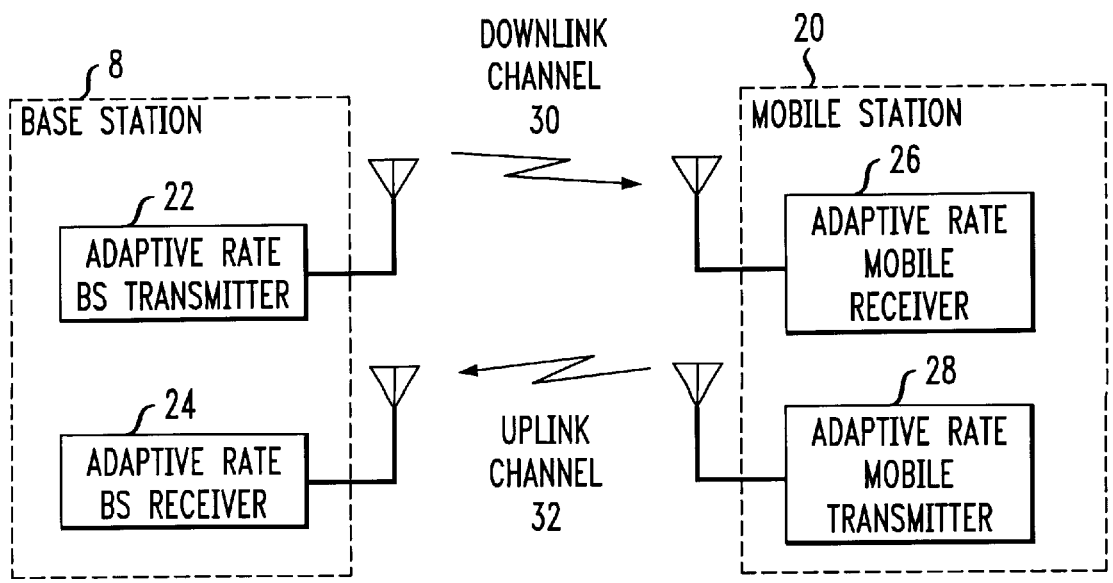
FIG. 2 is a block diagram of both the base station and the mobile station transmitters and receivers for the present invention.

The boundaries 14, 16 and 18 separating the cells 2, 4, and 6 generally represent the points where mobile assisted handoff occurs. As an example, when a mobile station 20 moves away from base station 8 towards an adjacent base station 10, the SINR from the base station 8 will drop below a certain threshold level past the boundary 14 while, at the same time, the SINR from the second base station 10 increases above this threshold as the mobile station 20 crosses the boundary 14 into cell 4. Cellular systems are engineered to provide coverage from each base station up until the cell boundary. Thus, the SINR over a large portion of a cell 2 is sufficient to support higher data rates because the SINR from the base station 8 is greater than the minimum SINR needed to support the data transfer at the boundary 14. FIG. 2 is an example implementation of an adaptive rate system which takes advantage of this support for higher data rates.

FIG. 2 is a block diagram for the schematic of the base station 8 and the mobile station 20 for the invention. The base station 8 consists of both an adaptive rate base station transmitter 22 and an adaptive rate base station receiver 24. Likewise, the mobile station 20 also consists of both an adaptive rate mobile station receiver 26 and an adaptive rate mobile transmitter 28. Each pair of the transmitter and the receiver, corresponding to either the base station 8 or mobile station 20, are in radio connection via a corresponding channel. Thus, the adaptive rate base station transmitter 22 is connected through a downlink radio channel 30 to the adaptive rate mobile receiver 26 and the adaptive rate mobile station transmitter 28 is connected through an uplink radio channel 32 to the adaptive rate base station receiver 24. This implementation allows for increased throughput between the base station 8 and the mobile station 20 over both the downlink channel 30 and the uplink channel 32 because of the use of adaptive bandwidth efficient coded modulation schemes.

Thus, the information rate may be varied by transmitting at a fixed symbol rate (as in IS-130/IS-136), and changing the bandwidth efficiency (number of information bits per symbol) using a choice of coded modulation schemes. However, coded modulation schemes with different bandwidth efficiencies have different error rate performance for the same SINR per symbol. At each SINR, the coded modulation scheme is chosen which results in the highest throughput with acceptable FER and retransmission delay. Therefore, detection of channel quality in terms of SINR or achievable FER is very important for this invention. Both the SINR and FER as channel quality metrics can be derived from the cumulative Euclidean distance metric corresponding to a decoded received sequence.

Figure 3:
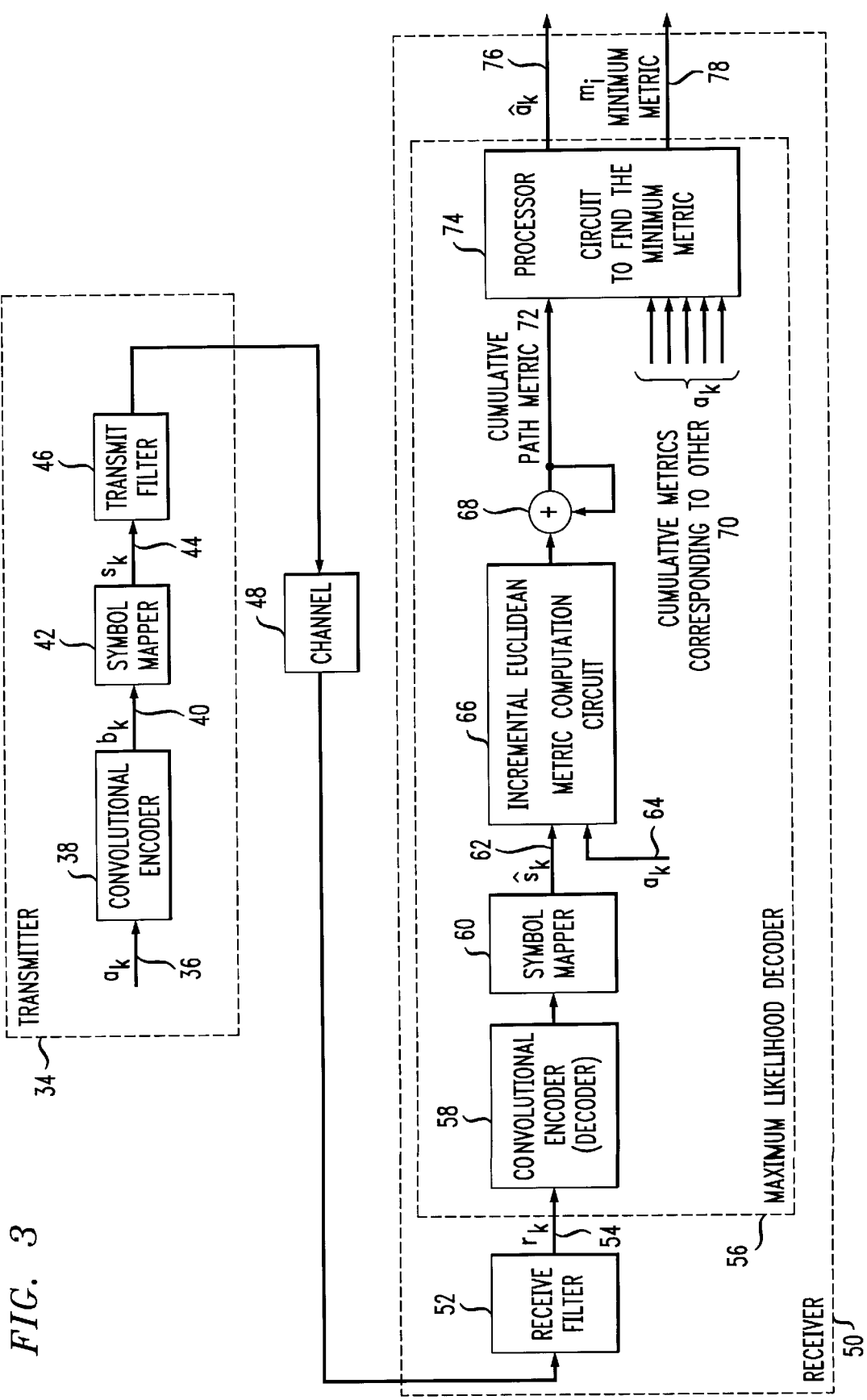
FIG. 3 is a block diagram of a decoder system for present invention.

A block diagram of a encoder and decoder system for the invention is shown in FIG. 3. Within the transmitter 34, the information sequence $\{a_k\}$ 36 is encoded using a convolutional encoder 38 to provide a coded sequence $\{b_k\}$ 40. The coded sequence $\{b_k\}$ 40 is then mapped through a symbol mapper 42 to a symbol sequence $\{s_k\}$ 44 from either an M-ary constellation such as M-ary phase shift keying (PSK) or a M-ary quadrature amplitude modulation (QAM) scheme using either a straightforward Gray mapping or a set partitioning technique. Pulseshaping is then carried out using transmit filters 46 that satisfy the Gibby Smith constraints (i.e. necessary and sufficient conditions for zero intersymbol interference). The symbol sequence $\{s_k\}$ 44 is then transmitted through the channel 48 to the receiver 50. At the receiver 50, the front end analog receive filters 52 are assumed to be matched to the transmit filters 46 and the output $\{r_k\}$ 54 is sampled at the optimum sampling instants.

The received symbol at the $k^{th}$ instant is given by $$r_k = \alpha_k s_k + n_k,$$

where $s_k$ denotes the complex transmitted symbol $\alpha_k$ represents the complex fading channel coefficient 64 and $n_k$ denotes the complex additive white Gaussian noise (AWGN) with variance $N_o$. For this example, the fading channel coefficients 64 are assumed to be correlated, and may be represented by a number of models. In this example the Jakes' model for Rayleigh fading is used. The convolutional encoder 38 is chosen to optimize the systems needs. Here, a trellis code has been chosen, however, many other codes could also be used by this invention without modifying the essence of the invention. Maximum likelihood decoding at the receiver 50 may be carried out using a Viterbi algorithm circuit (also known as a maximum likelihood decoder) 56 to search for the best path through a trellis. An estimate of the complex fading channel coefficients 64 is assumed available to the decoder (i.e. the convolutional encoder 58) of the receiver 50.

The Viterbi algorithm circuit 56 associates an incremental Euclidean distance metric with each trellis branch transition and tries to find the transmitted sequence $\{s_k\}$ 44 that is closest in Euclidean distance to the received sequence $\{r_k\}$ 54. The Viterbi algorithm circuit 56 processes each possible data sequence $\{r_k\}$ through both a convolutional encoder 58 and symbol mapper 60 to produce a possible decoded sequence $\{\tilde{s}_k\}$ 62. The Viterbi algorithm circuit 56 then uses the received sequence $\{r_k\}$ 54 and the estimated channel coefficient $\{\alpha_k\}$ 64 in an incremental Euclidean distance metric computation circuit 66 which computes the incremental Euclidean distance. The incremental Euclidean distance metric is then processed through a cumulative feedback loop 68 which produces the cumulative path metric 72. At the end of the ith receiving block cumulative path metric 72 and the cumulative metrics corresponding to all possible transmitted sequences $\{\alpha_k\}$ 70 are input into a minimum metric processor circuit 74 which outputs both the decoded data sequence $\{\hat{a}_k\}$ 76 and the minimum metric $m_i$ 78 for the $i^{th}$ block. The cumulative path metric corresponding to the decoded sequence $\{\hat{s}_k\}$ 62 is given by $$m_i = \min_{\tilde{s}_k} \sum_{k=0}^{N-1} |r_k - \alpha_k \tilde{s}_k|^2 = \sum_{k=0}^{N-1} |r_k - \alpha_k \hat{s}_k|^2$$

where $\alpha_k$ 64 is the estimated fading channel coefficient at the $k^{th}$ instant, and each block consist of N symbol i.e, the trellis is assumed to terminate at a known state after every N symbols.

Thus, in accordance with one aspect of the present invention, the Viterbi decoder is used to derive the channel quality information from the cumulative Euclidean distance metric corresponding to the decoded (sequence) trellis path for each block. However, as noted earlier, the minimum Euclidean distance metric has large variations from one block to another in the presence of a fading channel. Thus smoothing, such as averaging, of these variation is required to obtain a good estimate of the metric. A small minimum Euclidean distance metric would indicate that the received sequence is very close to the decoded sequence. For well designed trellis codes, this situation would only occur under good channel conditions with high SINR. Under poor channel conditions, the metric is much higher. Thus, a good estimate of the metric can be obtained at the $i^{th}$ block of N symbols by using the following relationship:

$$M_i = \alpha M_{i-1} + (1-\alpha) m_i,$$

for a greater than zero and less than 1.0, where $m_i$ represents the decoded trellis path metric and $\alpha$ represents the filter coefficient which determines the variance of the estimate.

Figure 4:
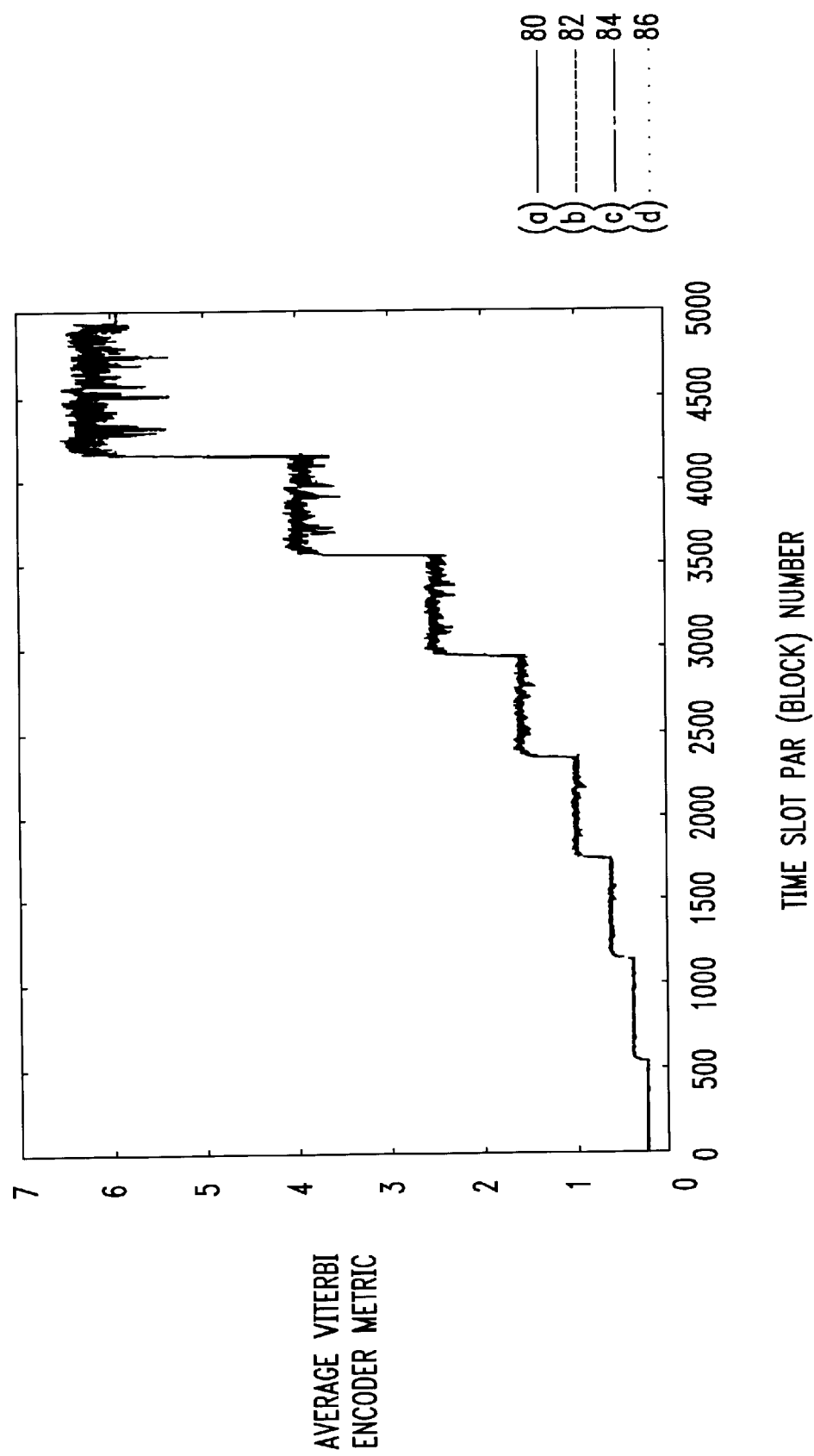
FIG. 4 is a graph having a curve, with the vertical scale representing the average Viterbi decoder metric and the horizontal scale representing the time slot pair (block) number.

FIG. 4, illustrates a graph having four curves, with the vertical scale representing the average moving metric $M_i$ 79 and the horizontal scale representing the block number 81. The curves 80–86 represent the time evolution of the filtered Viterbi decoder metric for a trellis coded 8 PSK scheme and a filter coefficient $\alpha$ equal to 0.9. An IS-130/IS-136 time slot structure (N=260 symbols) is assumed and the trellis is terminated at the end of each time slot pair. The SINR ranges from 30 dB to 16 dB and is decremented in steps of 2 dB after every 600 time slot pairs. Each curve represents a different combination of $f_d$, the doppler frequency, multiplied by T, the symbol duration. Therefore, the curve parameters are as follows: (a)$f_d$T=0.0002 for curve 80; (a)$f_d$T= 0.0012 for curve 82, (a)$f_d$T=0.0034 for curve 84; and (a)$f_d$T=0.0069 for curve 86. From FIG. 4, it is clear that there exists a straightforward one to one mapping between the moving average Euclidean distance metric $M_i$ and the SINR. It maintains a steady level when the SINR is fixed and increases when the SINR decreases.

Figure 5:
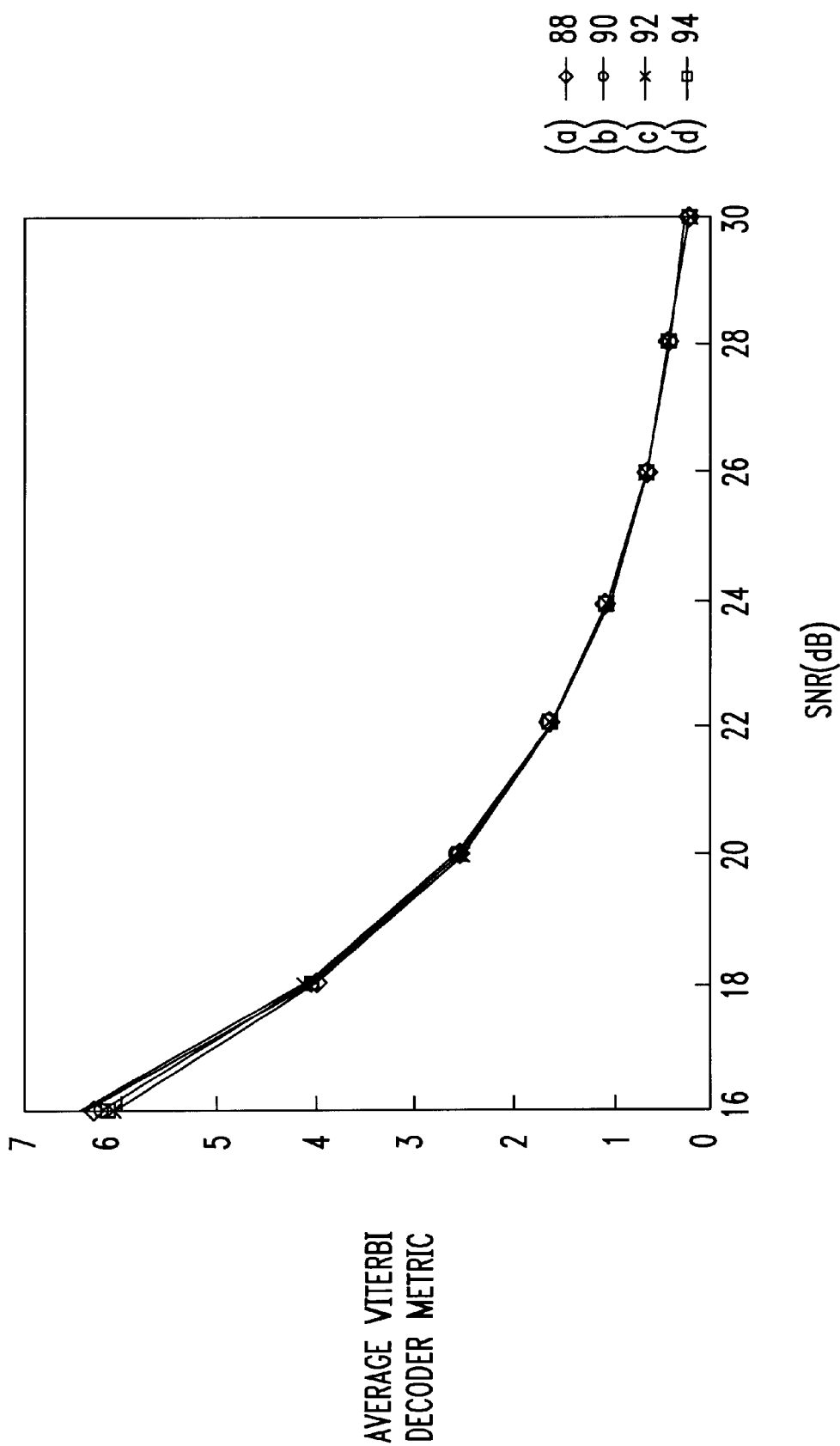
FIG. 5 is a graph having a curve, with the vertical scale representing the average Viterbi decoder metric and the horizontal scale representing the SINR.

FIG. 5 shows a graph having four curves, with the vertical scale representing $\mu$ the long term average of the minimum Euclidean distance Viterbi decoder metric $m_i$ (the expected value of $m_i$) and the horizontal scale representing the SINR. The long term cumulative metric average m 87 is the expected value (expectation) of $M_i$. Again, as in FIG. 4, the four curves 88–94 represent different doppler frequencies. From FIG. 5, it is clear that the average metric $\mu$ does not depend on the mobile speed. As a result, the long term cumulative metric average, $\mu$, is the target metric for the present invention. Thus, once the Euclidean metric has been obtained, it can be either mapped to the corresponding SINR in a lookup table or through a linear prediction approach.

The long term cumulative metric average $\mu$ and the SINR satisfy the empirical relationship $$SINR = 10 \log_{10} \frac{NE_s}{\mu} \text{ in dB,}$$

where $E_s$ is the average energy per transmitted symbol and N is the number of symbols per block. This behavior remains identical across the different coded modulation schemes. Therefore, the average Viterbi decoder metric provides a very good indication of the SINR. Furthermore, the short term average of the metric may be determined using the above mentioned relationship $M_i = \alpha M_{i-1} + (1-\alpha) m_i$. FIG. 4 shows that the short term average satisfies $$\theta_{low} < \frac{M_i}{\mu} < \theta_{high}$$

where the target metric, $\mu$, is obtained from $$SINR = 10 \log_{10} \frac{NE_s}{\mu}.$$

The thresholds, $\theta_{low}$ and $\theta_{high}$ depend on the standard deviation of $M_i$ which, in turn, is a function of the filter parameter, $\alpha$. Thus, the present invention incorporates two possible ways to determine the SINR from the average metric $M_i$.

Figure 6:
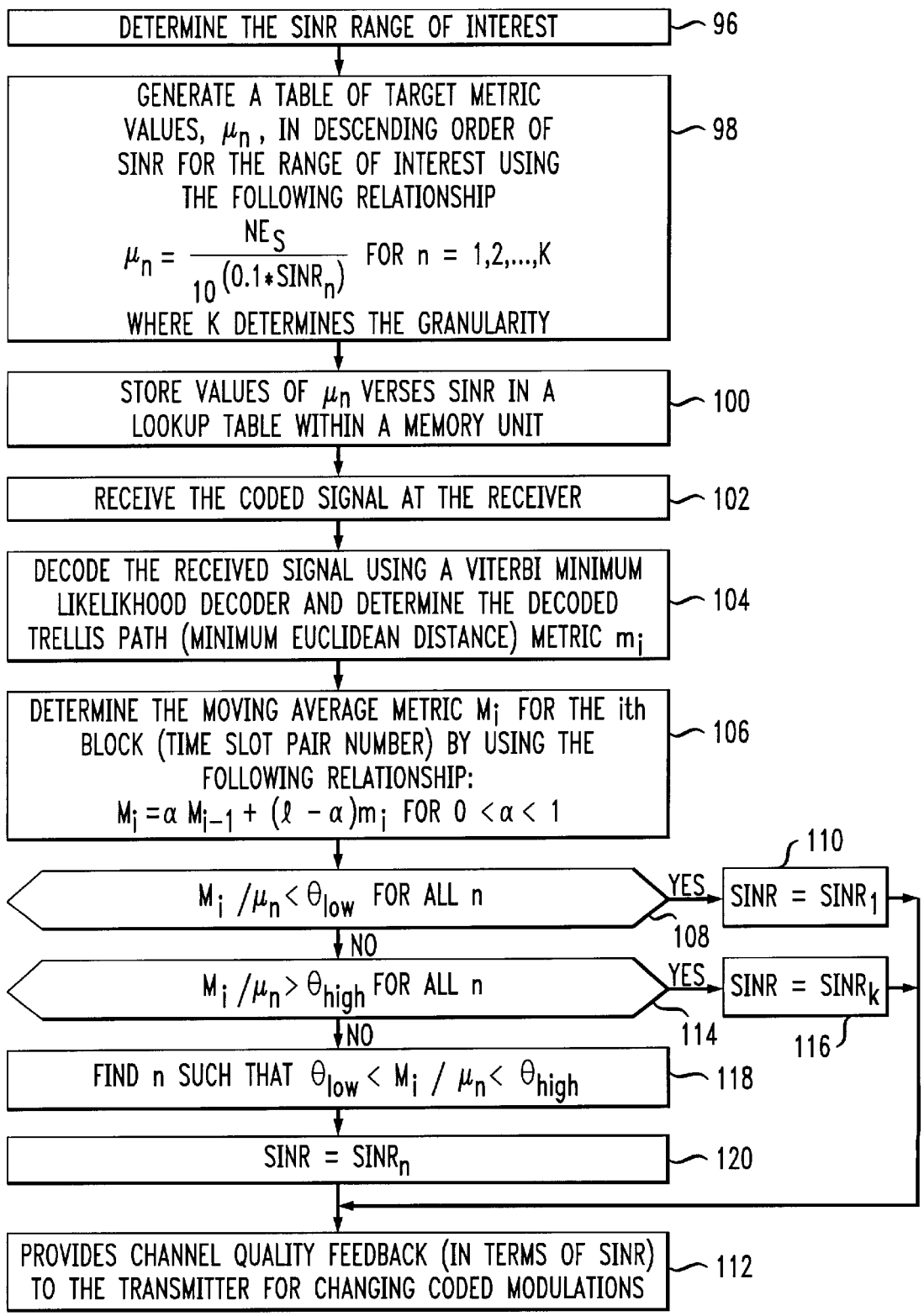
FIG. 6 a flow diagram illustrating the steps performed during the process of determining the SINR using the lookup table and adjusting the coded modulation scheme used by the system.

FIG. 6 is a flow diagram describing the steps performed by either the base station or the mobile station in determining the SINR from the average metric $M_i$ using a lookup table. The process begins in step 88 in which the cellular network determines the SINR range of interest. This SINR range is determined by the needs of the network at any given time.

The next step 98 is to generate a table of target metric values $\mu_n$ in descending order of SINR for the determined range of interest. Arrangement in descending order is purely for example and not a necessary or limiting aspect of the process. The target metric values are determined by the following relationship $$\mu_n = \frac{NE_s}{10^{0.1(SNR_n)}}$$

for n=1, 2, ... K, where K determines the desired granularity. In step 100, these values of $\mu_n$ versus the corresponding value of SINR are then stored into a memory unit for later use in mapping the measured values of $$\frac{M_i}{\mu_n}$$

to the corresponding SINR values in the lookup table. Once the process of creating and storing the lookup table of $\mu_n$, versus $SNIR_n$ is complete, the system is then ready to receive and transmit data.

In step 102, the receiver receives, for this example, a trellis coded signal and then decodes the received coded signal and outputs the trellis path metric $m_i$ in step 104. For this example, the system uses a Maximum Likelihood decoder to determine the trellis path metric $m_i$. Once the trellis path metric $m_i$ is determined the system then determines $M_i$, the average metric for the $i^{th}$ block, in step 106 using the relationship $M_i = \alpha M_{i-1} + (1-\alpha) m_i$.

The process continues to decision step 108 in which a threshold detector circuit determines whether the value $$\frac{M_i}{\mu_l}$$

is less than the predetermined threshold $\theta_{low}$. If the outcome of the decision step 108 is a "YES" determination, the process continues to step 110. In step 110, the system recognizes that the measured SINR is greater than the $SINR_1$ (the maximum SINR for the range of the lookup table). As a result, the system in step 110 clips the measured SINR to be equal to $SINR_1$. Next, the system in step 112 provides the SINR value $SINR_1$ to the transmitter.

If the outcome of the determination step 108 is a "NO" determination, the process continues instead to decision step 114 in which a second threshold detector circuit determines whether the value $$\frac{M_i}{\mu_k}$$

is greater than the predetermined threshold $\theta_{high}$. If the outcome of the decision step 114 is a "YES" determination, the process continues to step 116. In step 116, the system recognizes that the measured SINR is less than the $SINR_k$ (the minimum SINR for the range of the lookup table). As a result, the system in step 116 clips the measured SINR to be equal to the $SINR_k$. Next, the system in step 112 provides the SINR value $SINR_k$ to the transmitter.

If, on the other hand, the outcome of the determination step 114 is a "NO" determination, the process continues instead to decision step 118 in which a threshold detector circuit determines the threshold $\mu_n$ for which the value $$\frac{M_i}{\mu_n}$$

is both less than the predetermined threshold $\theta_{high}$ and greater than the predetermined threshold $\theta_{low}$. The system in step 120 sets the measured SINR equal to the corresponding $SINR_n$ for the mapped value of $$\frac{M_i}{\mu_n}$$

in the lookup table. As a result, the system in step 112 provides the SINR value $SINR_n$ to the transmitter.

Figure 7:
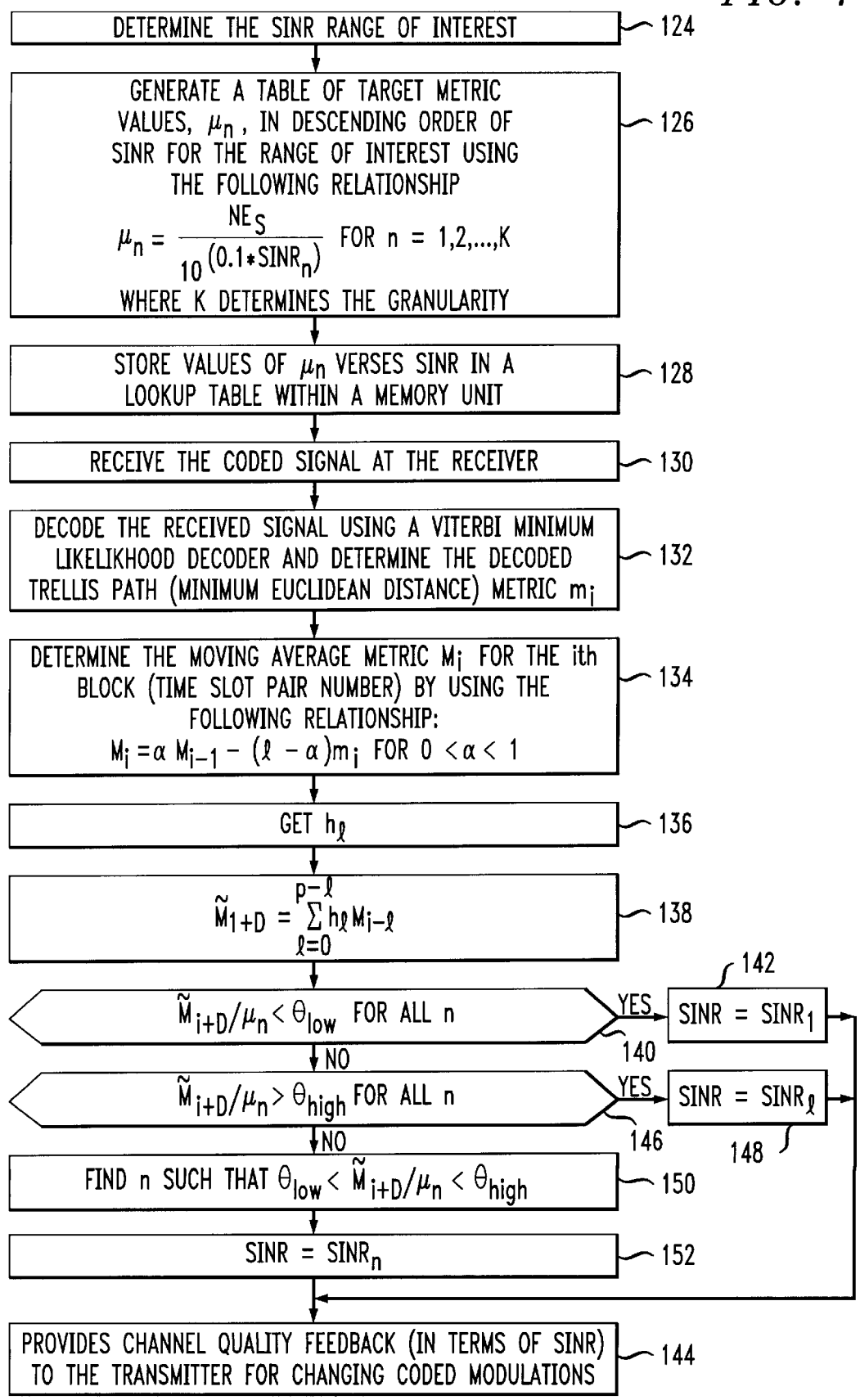
FIG. 7 is a flow diagram illustrating the steps performed during the process of determining the SINR using the linear prediction and adjusting the coded modulation scheme used by the system.

FIG. 7 is a flow diagram describing the steps performed by either the base station or the mobile station in determining the SINR from the moving average metric $M_i$ using a linear prediction process. The process begins in step 126 in which the cellular network determines the SINR range of interest. Similar to the lookup table approach describe earlier, this SINR range is first determined by the needs of the network at any given time. However, the use of a linear prediction, instead of the direct mapping of a lookup table, approach allows the receiver to react faster to the changes of SINR within the cell.

In step 126, a table of target values $\mu_n$, in descending order of SINR, is generated for the determined range of interest. Again, arrangement in descending order is purely for example and not a necessary or limiting aspect of the process. The target values are determined by the following relationship $$\mu_n = \frac{NE_s}{10^{0.1(SNR_n)}}$$

for n=1, 2, . . . K, where K determines the desired granularity. In step 128, these values of $\mu_n$ versus the corresponding value of the SINR are then stored into a first memory unit for later use in mapping the measured values of $$\frac{M_i}{\mu_n}$$

to the corresponding SINR values in the lookup table. Once the process of creating and storing the lookup table of $\mu_n$ versus $SINR_n$ is complete, the system is then ready to receive and transmit data information.

In step 130, the receiver receives a coded signal, a trellis code for the example, and then decodes the received coded signal and outputs the trellis path metric $m_i$ in step 132. Again, for this example, the system uses a Viterbi minimum Likelihood decoder to determine the trellis path metric $m_i$. Once the trellis path metric $m_i$ is determined, the system then determines $M_i$ the average metric for the $i^{th}$ block in step 134 using the relationship $M_i=\alpha M_{i-1}+(1-\alpha)m_i$. Then in step 136, the values of an optimal $p^{th}$ order linear predictor $h_l$ (for l=0, 1, . . . , p-1) are generated and stored in to a second memory unit for later use. Next, in step 138, the process proceeds and determines the future value of $\tilde{M}_{i+D}$ from the previous values of $\tilde{M}_{i+D}$ using the relation $$\tilde{M}_{i+D} = \sum_{l=0}^{p-1} h_l M_{i-l}.$$

The process continues to decision step 140 in which a threshold detector circuit determines whether the value $$\frac{\tilde{M}_{i+D}}{\mu_l}$$

is less than the predetermined threshold $\theta_{low}$. If the outcome of the decision step 140 is a "YES" determination, the process continues to step 142. The system in step 142 clips the measured SINR to be equal to $SINR_1$. Next, the system in step 144 provides the SNR value $SNR_1$ to the transmitter.

If the outcome of the determination step 140 is a "NO" determination, the process continues instead to decision step 146 in which a second threshold detector circuit determines whether the value $$\frac{\tilde{M}_{i+D}}{\mu_k}$$

is greater than the predetermined threshold $\theta_{high}$. If the outcome of the decision step 146 is a "YES" determination, the process continues to step 148. The system in step 148 clips the measured SINR to be equal to $SINR_k$. Next, the system in step 144 provides the SINR value $SINR_k$ to the transmitter.

If, on the other hand, the outcome of the determination step 146 is a "NO" determination, the process continues instead to decision step 150 in which a threshold detector circuit determines whether the value $$\frac{\tilde{M}_{i+D}}{\mu_n}$$

is both less than the predetermined threshold $\theta_{high}$ and greater than the predetermined threshold $\theta_{low}$. The system in step 152 sets the measured SINR equal to the corresponding $SNR_n$ for the mapped value of $$\frac{\tilde{M}_{i+D}}{\mu_n}$$

in the lookup table. As a result, the system in step 144 provides the SINR value $SINR_n$ to the transmitter.

This linear prediction approach helps the receiver use the current value and p-1 past values of the average metric to predict the channel quality metric D blocks in the future. Thus, this allows the receiver to react quickly to changes in the SINR.

While SINR is the preferred performance measure in the present invention, it is well known that performance is often measured in terms of FER for the forward and reverse links. At a fixed SINR, the FER may often be different at different mobile speeds. In order to obtain a FER indication the SINR should be mapped to the average FER under some wide range of mobility. At each value of SINR, define the weighted sum $$\overline{FER} = \sum_i f_i w_i$$

where $\Sigma w_i = 1$, $f_i$ is the FER at speed, $v_i$, the coefficient, $w_i$, represents the weight assigned to the speed and $\overline{FER}$ denotes the weighted average FER. By this technique it is possible to use the average metric to determine the SINR which in turn may be mapped to $\overline{FER}$.

As an example of an implemented rate adaptation system using the SINR measurements as a channel quality indicator. Let $C_1, C_2, \ldots, C_Q$ represent, in ascending order of bandwidth efficiency, the Q different modes of operation schemes for the transmitter. These different schemes may be implemented by using a fixed symbol rate and changing the trellis encoder and symbol mapper to pack a variable number of information bits per symbol. The upper bound on achievable throughput for each $C_j$ at some SINR is given by $R(C_j)(1- \overline{FER}(C_j, \text{SINR}))$ where $R(C_j)$ is the data rate corresponding to $C_j$ in bits/second. The actual throughput can be lower as it also depends on higher recovery layers which may time-out during retransmission.

Figures 8, 9:
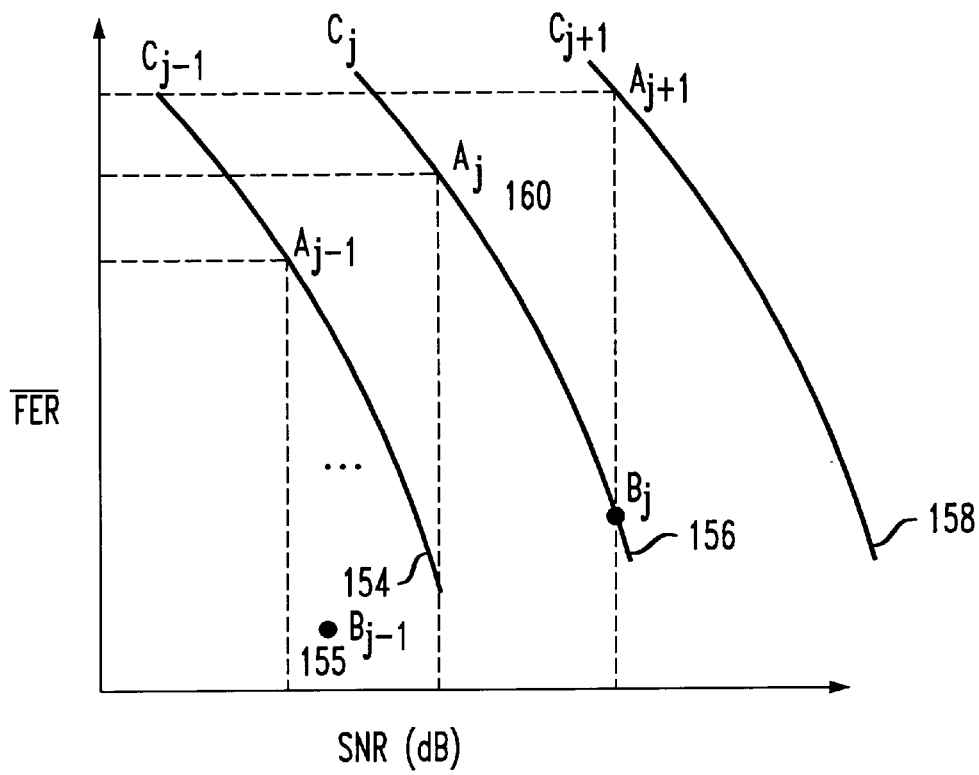
FIG. 8 is a graph having a three curves, with the vertical scale representing the $\overline{FER}$ and the horizontal scale representing the SINR.
FIG. 9 is a table of values for a conservative mode adaptation strategy based on a Viterbi algorithm metric average.

FIG. 8, illustrates a graph having a three curves, with the vertical scale representing the $\overline{FER}$ and the horizontal scale representing the SINR. The curves 154, 156, and 158 represent three hypothetical coded modulation schemes. For each coded modulation scheme, $C_j$, $\overline{FER}_j$ is the average FER computed by averaging across mobile speeds. As an example, associated with curve 156 is adaptation point $A_j$ 160. If the SINR falls below this point the transmitter must change its mode from scheme $C_j$ to scheme $C_{j-1}$ and begin operation on curve 154, at $B_{j-1}$ 155, corresponding to scheme $C_{j-1}$. above which $C_j$ has lower throughput than $C_{j-1}$. The filtered Viterbi decoder metric may be used as an indicator of SINR at the mode adaptation point. For the $i^{th}$ decoded block, set $\tilde{M}_i = \tilde{M}_I$ or $\tilde{M}_i = \tilde{M}_{i+D}$ depending on the choice of filter parameter.

$\theta_{high}$ and $\theta_{low}$ are the thresholds which depend on the filter parameter, $\alpha$. Then, the adaptation rule for the data transmission is as follows: After the $i^{th}$ block, if the transmitter is currently operating with $C_j$ change the mode of operation to $C_{j-1}$, if $\tilde{M}_i / \mu_j > \theta_{high}$, for $j = 2, 3, \ldots, Q$ and $C_{j+1}$, if $\tilde{M}_j / \mu_{j+r} < \theta_{low}$, for $j = 1, 2, \ldots, Q-1$ where $r = 1, 2, \ldots, Q-j$. For each $j$, the highest allowable value of r maximizes the throughput by permitting a operation at a higher rate in bits per symbol. Finally, filtering of the metric can be applied across the coded modulation schemes since the metric average, $\mu$, is independent of the mobile speed or the coded modulation scheme. Thus, there is no need to reset the channel quality measure after the adaptation.

Applying actual data to this example, FIG. 9 shows a table of values for a conservative mode adaptation strategy based on a Viterbi algorithm metric average. In, FIG. 9, $C_1$, $C_2$, and $C_3$ represent three coded modulation schemes where the choice of $C_1$ results in the lowest data rate and $C_3$ results in the highest data rate. Here, $\mu_1$, $\mu_2$ and $\mu_3$ are the target metrics corresponding to the $\overline{FER}$ adaptation points for the three respective coded modulations. The thresholds $\theta_{high}$ and $\theta_{low}$ are defined such that $\theta_{high}$ is greater than 1.0 and $\theta_{low}$ less than 1.0. Additionally, FIG. 10 show a table of values for an aggressive mode adaptation strategy based on a Viterbi algorithm metric average.

Figures 10, 11:
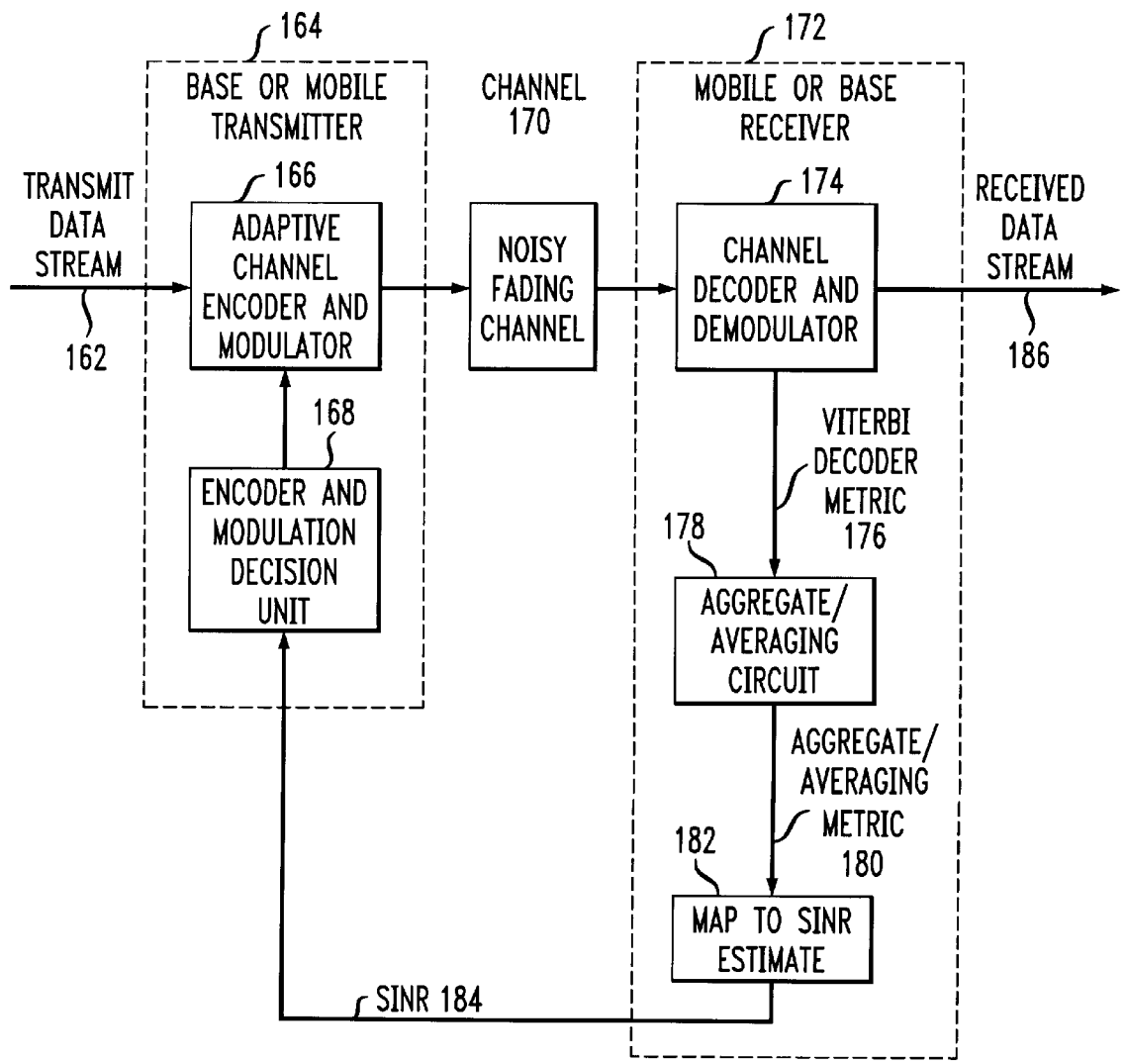
FIG. 10 is a table of values for an aggressive mode adaptation strategy based on a Viterbi algorithm metric average.
FIG. 11 is a block diagram of both the base station and the mobile station transmitters and receivers for the implementation of an adaptive coding scheme.

A block diagram of an adaptive rate system for the invention is shown in FIG. 11. The diagram shows the possible implementation of the system at either the base station or the mobile station. The system operates in the following way. Initially, the system organizes the information to be transmitted into a transmit data stream 162. The transmit data stream 162 is then input into the transmitter 164 of the system. Within the transmitter 164, the transmit data stream 162 is encoded and modulated by the adaptive channel encoder and modulator 166. The encoding and modulation employed by the adaptive channel encoder and modulator 166 are controlled by the encoder and modulation decision unit 168. The encoder and modulation decision unit 168 determines the correct encoding and modulation scheme in response to the received SINR estimate 184 from the receiver 172. Initially, the encoder and modulation decision unit 168 chooses a predetermined scheme which is input to the adaptive channel encoder and modulator 166. The adaptive channel encoder and modulator 166 then encodes and modulates the transmit data stream 162 to a predetermined scheme and transmits the information through a channel 170 (possibly noisy and fading) to the receiver 172. After the information is received at the receiver 172 it is input into a channel decoder and demodulator 174 which produces two outputs. The first output of the channel decoder and demodulator 174 is a value of the Viterbi decoder metric 176 for the received information signal. The second output of the channel decoder and demodulator 174 is the received data stream 186 which will be the same as the information sent by the transmit data stream 162 a large fraction of the time. Next, the value of the Viterbi decoder metric 176 is averaged by an aggregate/averaging circuit 178 producing a moving average value for the Viterbi decoder metric 180. The moving average value for the Viterbi decoder metric 180 is then mapped to SINR estimate 184 by a mapping circuit 182. The resulting SINR estimate 184 is fed back into the encoder and modulation decision unit 168 to determine the encoder and modulation scheme to be used corresponding to the SINR estimate 184. The new scheme value of the encoder and modulation decision unit 168 is input into the adaptive channel encoder and modulator 166 which switches to the new encoding and modulation scheme for the transmit data stream 162 and transmits the information over the channel 170.

Figure 12:
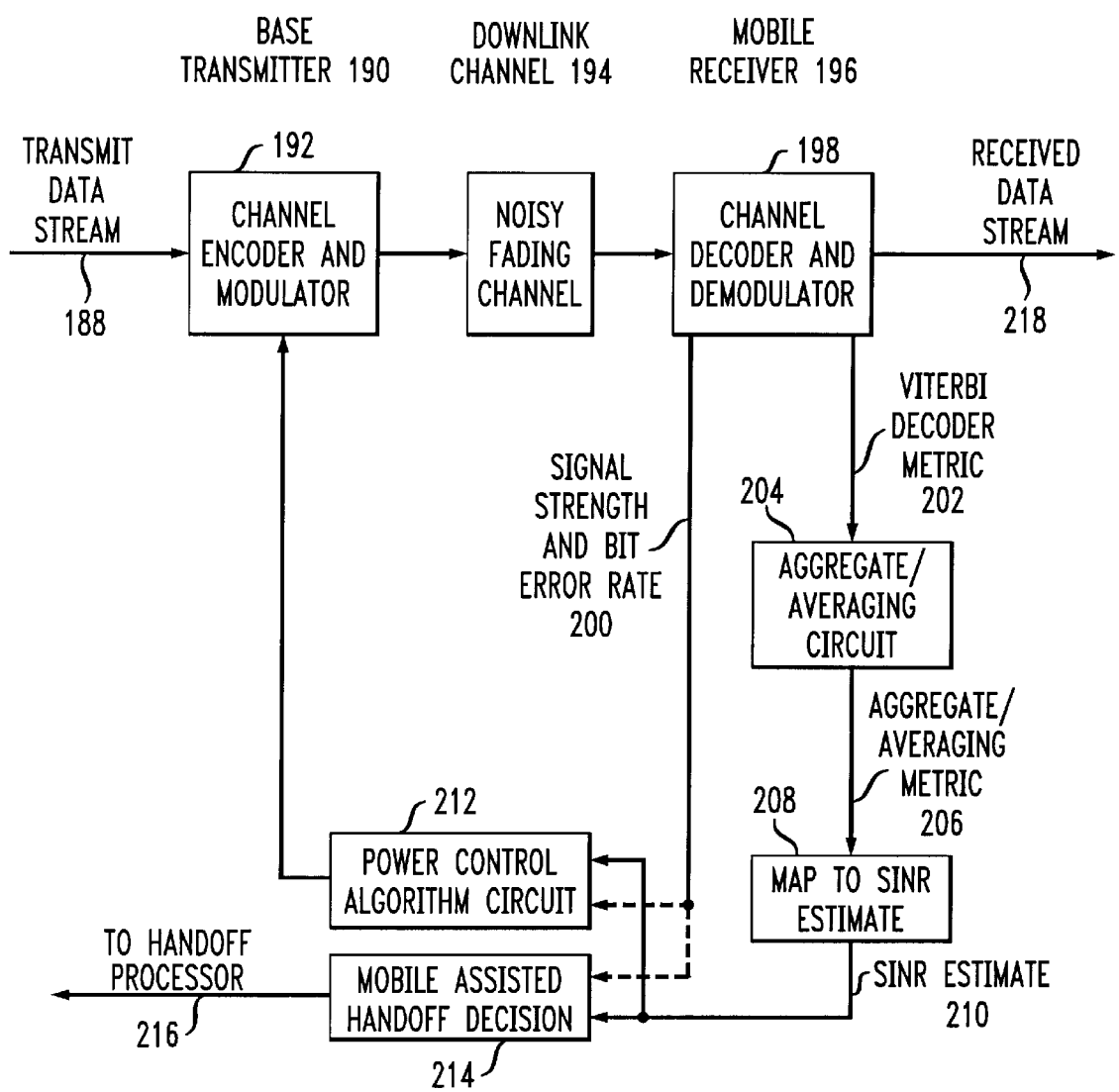
FIG. 12 is a block diagram of both the base station and the mobile station transmitters and receivers for the implementation of a mobile handoff scheme.

A block diagram of a system using the SINR to do power control is shown in FIG. 12. The diagram shows the possible implementation of the system at either the base station or the mobile station. The system operates in the following way. Initially, the system organizes the information to be transmitted into a transmit data stream 188. The transmit data stream 188 is then input into the transmitter 190 of the system. Within the transmitter 190, the transmit data stream 188 is encoded and modulated by the channel encoder and modulator 192. The transmit power level at the channel encoder and modulator 192 is controlled by the power control algorithm circuit 212. The power control algorithm circuit 212 may determine the power control level in response to the received SINR estimate 210 from the receiver 196. Additionally, the power control algorithm circuit 212 may also determines the power control level in response to the signal strength and bit error rate estimate 200 from the receiver 196. Initially, the power control algorithm circuit 212 is set to a predetermined value which is input to the channel encoder and modulator 192. The channel encoder and modulator 192 then encodes and modulates the transmit data stream 188 using a predetermined encodes and modulation scheme and transmits the information at a predetermined power level through a channel 194 (possibly noisy and fading) to the receiver 196. After the information is received at the receiver 196 it is input into a channel decoder and demodulator 198 which produces three outputs. The first output of the channel decoder and demodulator 198 is a value of the Viterbi decoder metric 202 for the received information signal. The second output is estimates of the signal strength and bit error rate 200. The third output of the channel decoder and demodulator 198 is the received data stream 218 which should be the same as information sent by the transmit data stream 188. Next, the value of the Viterbi decoder metric 202 is averaged by an aggregate/averaging circuit 204 producing an moving average value for the Viterbi decoder metric 206. The moving average value for the Viterbi decoder metric 206 is then mapped to SINR estimate 210 by a mapping circuit 208. The resulting SINR estimate 210 is fed back into the power control algorithm circuit 212 to determine a power control value corresponding to the SINR estimate 210. The new power control value of the power control algorithm circuit 212 is input into the channel encoder and modulator 192 for use in subsequent transmissions of the data stream 188 over the channel 194 to the receiver.

Additionally, the mobile assisted handoff decision circuit 214 also processes the SINR estimate 210 and the signal strength and bit error rate estimates 200. If the SINR value is below a predetermined threshold the mobile assisted handoff decision circuit 214 sends a message to the handoff processor 216 to handoff the mobile station to a new base station.

In conclusion, the following summary should easily enable one skilled in the art to practice the invention. The first part of the invention is an apparatus for adaptively changing the modulation schemes of a transmit data stream based on the measured SINR of a channel. The adaptive modulation schemes are implemented in a transmitter by an adaptive channel encoder and modulator. An encoder and modulation decision unit is connected to the transmitter adaptive channel encoder and modulator to determine the correct encoding and modulation scheme based on the information received at the receiver. Then a receiver channel decoder and demodulator is placed in radio connection with the transmitter adaptive channel decoder and demodulator through the channel. This transmitter adaptive channel decoder and demodulator produces a path metric value which is averaged by an averaging circuit to produce an averaged path metric value. This averaged path metric value is then mapped through a mapping device to a SINR estimate value. The SINR estimate value is then input into the transmitter encoder and modulation decision unit to determine if the coding and modulation scheme should be changed in response to the SINR estimate value. It should be noted that the receiver channel decoder and modulator may be implemented in various way, however, in this example implementation a Viterbi decoder was used.

The second part of the invention is an apparatus for implementing mobile assisted handoff based on the measured SINR of a channel. The mobile assisted handoff is implemented in a transmitter by a channel encoder and modulator. A receiver channel decoder and demodulator is in radio connection with the transmitter channel decoder and demodulator through a channel. The receiver channel decoder and demodulator produces a path metric value in response to the information received by the receiver which is averaged by an averaging circuit to produce an averaged path metric value. This averaged path metric value is then mapped through a mapping device to a SINR estimate value. A power control algorithm circuit is connected to the transmitter channel encoder and modulator which varies the power level of the transmitter in response to the SINR estimate value. Finally, the SINR estimate value is input into a mobile assisted handoff decision unit which determines if the mobile station should perform a handoff operation based on the SINR estimate value. As in the first part of the invention, it should again be noted that the receiver channel decoder and modulator may be implemented in various way, however, in this example implementation a Viterbi decoder was used. Additionally, this second part of the invention can be either implement at the mobile station or the base station.

Please note that while the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope. The scope of the invention is indicated by the attached claims.

What is claimed is:

1. A method for determining the signal to interference plus noise ratio, comprising the steps of:

establishing a set of path metrics corresponding to a set of signal to interference plus noise ratios;

receiving a digital signal;

determining a path metric for said digital signal;

establishing a set of signal to interference plus noise ratio values corresponding to a set of short term average of metric values, said short term average of metric values defined as $M_i/\mp$, wherein $M_i$ is an average Euclidean decoder metric value and $\mp$ is the expectation value of a decoded path metric, determining the decoded path metric from said received digital signal using a decoder, said decoded path metric defined as $m_i$, averaging $m_i$ to produce an average decoded path metric;

storing in a memory unit said average decoded path metric, said average decoded path metric defined as $\mp$;

determining an estimated Euclidean distance metric; and mapping said path metric to said corresponding signal to interference plus noise ratio in said set of signal to interference plus noise ratios.

2. The method of claim 1, wherein said digital signal is a coded signal.

3. The method of claim 1 wherein said digital signal is a trellis coded signal.

4. The method of claim 1 wherein the step of determining the estimated Euclidean distance metric is performed using the following equation:

$$M_i = \alpha M_{i-1} + (1-\alpha) m_i$$

where said estimated Euclidean distance metric is defined as $M_i$ and $\alpha$ is a predetermined filter coefficient which is greater than zero and less then 1.0.

5. The method of claim 4 including the steps of
determining a standard deviation of $M_i$;
determining average metric thresholds defined as $\theta_{low}$ and $\theta_{high}$ based on the standard deviation of $M_i$;
determining a value for $M_i/\mu$ by dividing said value of $M_i$ by said value of $\mu$;
mapping said value of $M_i/\mu$ to a minimum value of said corresponding signal to interference plus noise ration if $M_i/\mu$ is less than $\theta_{low}$;
mapping said value of $M_i/\mu$ to a maximum value of said corresponding signal to interference plus noise ratio if m/u is greater than $\theta_{high}$; and
mapping said value of $M_i/\mu$ to said corresponding signal to interference plus noise ratio.

6. The method of claim 1 wherein said decoder is a Viterbi decoder for a maximum likelihood path.

7. A system for determining the signal to interference plus noise ratio, comprising:
means for establishing a set of path metrics corresponding to a set of signal to interference plus noise ratios;
means for receiving a digital signal;
means for determining a path metric for said digital signal;
means for establishing a set of signal to interference plus noise ratio values corresponding to a set of short tern average of metric values, said short term average of metric values defined as $M_i/\mp$, wherein $M_i$ is an average Euclidean decoder metric value and $\mp$ is the expectation value of a decoded path metric;
means for determining the decoded path metric from said received digital signal using a decoder, said decoded path metric defined as $m_i$;
means for smoothing $m_i$ to produce an average decoded path metric;
means for storing in a memory unit said average decoded path metric, said average decoded path metric defined as $\mp$,
means for determining an estimated Euclidean distance metric; and
means for mapping said path metric to said corresponding signal to interference plus noise ratio in said set of signal to interference plus noise ratios.

8. The system of claim 7, wherein said digital signal is a coded signal.

9. The system of claim 7, wherein said digital signal is a trellis coded signal.

10. The method of claim 8 wherein the means for determining the estimated Euclidean distance metric is performed using the following equation:

$$M_i = \alpha M_{i-1} + (1-\alpha) m_i$$

where said estimated Euclidean distance metric is defined as $M_i$ and $\alpha$ is a predetermined filter coefficient which is greater than zero and less then 1.0.

11. The system of claim 7 further including
means for determining a standard deviation of $M_i$;
means for determining average metric thresholds defined as $\theta_{low}$ and $\theta_{high}$ based on the standard deviation of $M_i$;
means for determining a value for $M_i/\mu$ by dividing said value of $M_i$ by said value of $\mu$;
means for mapping said value of $M_i/\mu$ to a minimum value of said corresponding signal to interference plus noise ration if $M_i/\mu$ is less than $\theta_{low}$;
means for mapping said value of $M_i/\mu$ to a maximum value of said corresponding signal to interference plus noise ratio if m/u is greater than $\theta_{high}$; and
means for mapping said value of $M_i/\mu$ to said corresponding signal to interference plus noise ratio.

12. The system of claim 8 wherein said decoder is a Viterbi decoder for a maximum likelihood path.

13. A method for determining the frame error rate, comprising the steps of:
establishing a set of path metrics corresponding to a set of frame error rates;
receiving a digital signal;
establishing a set of path metrics corresponding to a set of signal to interference plus noise ratios,
mapping the signal to interference plus noise ratios to the frame error rates,
determining a path metric for said digital signal;
establishing a set of signal to interference plus noise ratio values corresponding to a set of short term average of metric values, said short term average of metric values defined as $M_i/\mp$, wherein $M_i$ is an average Euclidean decoder metric value and $\mp$ is the expectation value of a decoded path metric;
determining the decoded path metric from said received digital signal using a decoder, said decoded path metric defined as $m_i$;
averaging $m_i$;
storing in a memory unit said average decode oath metric, said average decoded path metric defined as $\mp$;
determining an estimated Euclidean distance metric; and
mapping said path metric to said corresponding frame error rate in said set of frame error rates.

14. The method of claim 13, wherein said digital signal is a coded signal.

15. The method of claim 13, wherein said digital signal is a trellis coded signal.

16. The method of claim 15 wherein the step of determining the estimated Euclidean distance metric is performed using the following equation $$M_i = /\alpha M_{i-1} + (1-/\alpha) m_i$$

where said estimated Euclidean distance metric is defined as $M_i$ and $\alpha$ is a predetermined filter coefficient which is greater than zero and less then 1.0.

17. The method of claim 16 further including the steps of
determining a standard deviation of $M_i$,
determining average metric thresholds defined as $\theta_{low}$ and $\theta_{high}$ based on the standard deviation of $M_i$,
determining a value for $M_i/\mu$ by dividing said value of $M_i$ by said value of $\mu$,
mapping said value of $M_i/\mu$ to a minimum value of said corresponding signal to interference plus noise ration if $M_i/\mu$ is less than $\theta_{low}$, mapping said value of $M_i/\mu$ to a maximum value of said corresponding signal to interference plus noise ratio if m/u is greater than $\theta_{high}$, and mapping said value of $M_i/\mu$ to said corresponding signal to interference plus noise ratio.

18. The method of claim 15 wherein said decoder is a Viterbi decoder for a maximum likelihood path.

19. A system for determining the frame error rate, comprising:

means for establishing a set of path metrics corresponding to a set of frame error rates;

means for establishing a set of path metrics corresponding to a set of signal to interference plus noise ratios, and means for mapping the signal to interference plus noise ratios to the frame error rates, means for receiving a digital signal;

means for determining a path metric for said digital signal;

means for establishing a set of signal to interference plus noise ratio values corresponding to a set of short term average of metric values, said short term average of metric values defined as $M_i/\mp$, wherein $M_i$ is an average Euclidean decoder metric value and $\mp$ is the expectation value of a decoded path metric;

means for determining the decoded path metric from said received digital signal using a decoder, said decoded path metric defined as $m_i$;

means for smoothing $m_i$;

means for storing in a memory unit said average decoded path metric, said average decoded path metric defined as $\mp$;

means for determining an estimated Euclidean distance metric; and means for mapping said path metric to said corresponding frame error rate in said set of frame error rates.

20. The system of claim 19, wherein said digital signal is a coded signal.

21. The system of claim 19, wherein said digital signal is a trellis coded signal.

22. The system of claim 1 wherein the step of determining the estimated Euclidean distance metric is performed using the following equation $$M_i = \alpha M_{i-1} + (1-\alpha) m_i$$

where said estimated Euclidean distance metric is defined as $M_i$ and $\alpha$ is a predetermined filter coefficient which is greater than zero and less then 1.0.

23. The system of claim 1 including the steps of means for determining a standard deviation of $M_i$, means for determining average metric thresholds defined as $\theta_{low}$ and $\theta_{high}$ based on the standard deviation of $M_i$, means for determining a value for $M_i/\mu$ by dividing said value of $M_i$ by said value of $\mu$, means for mapping said value of $M_i/\mu$ to a minimum value of said corresponding signal to interference plus noise ration if $M_i/\mu$ is less than $\theta_{low}$, means for mapping said value of $M_i/\mu$ to a maximum value of said corresponding signal to interference plus noise ratio if m/u is greater than $\theta_{high}$, and means for mapping said value of $M_i/\mu$ to said corresponding signal to interference plus noise ratio.

24. The system of claim 23 wherein said decoder is a Viterbi decoder for a maximum likelihood path.

25. A method for determining the signal to interference plus noise ratio values from a channel quality metric, comprising the steps of:

receiving a digital signal consisting of a plurality of blocks of N symbols;

determining the channel quality metric for the digital signal;

determining an Euclidean distance metric, $m_i$, for the $i^{th}$ block of the plurality of blocks;

determining a moving average metric $M_i$ for the $i^{th}$ block employing the following equation:

$$M_i = \rightarrow M_{i-1} = (1 - / \rightarrow) m_i$$

where $\rightarrow$ is a predetermined coefficient which is greater than zero and less than 1.0.

establishing a rule for mapping the channel quality metric to the signal to interference plus noise ratio values; and mapping the channel quality metric to the signal to interference plus noise ratio values using the rule.

26. The method of claim 25 wherein the step of determining the channel quality metric further includes the step of processing the digital signal to obtain estimates of the transmitted data and determining the channel quality metric from these estimates.

27. The method of claim 25 wherein each of the plurality of blocks of N symbols is derived from encoding and modulating a block of J information bits.

28. The method of claim 25 wherein the Euclidean distance metric, $m_i$, is a value produced by a minimum Euclidean distance decoder.

29. The method of claim 28 wherein the minimum Euclidean distance decoder is a Viterbi decoder.

30. The method of claim 25 wherein the step of determining the Euclidean distance metric $m_i$ further includes the steps of determining a estimated decoded sequence $\{\bar{a}_k\}$ of the digital signal using a decoder, re-encoding the decoded sequence $\{\bar{a}_k\}$ to obtain an estimate symbol sequence $\{\bar{s}_k\}$ of the digital signal, computing the Euclidean distance metric using the following equation $$m_i = \min_{\bar{s}_k} \sum_{k=0}^{N-1} |r_k - \alpha_k \bar{s}_k|^2 = \sum_{k=0}^{N-1} |r_k - \alpha_k \hat{s}_k|^2$$

where $\{r_k\}$, k=1, 2, ..., N is the received sequence and $\{\alpha_k\}$, k=1, 2, ..., N denotes the estimated channel coefficients.

31. The method of claim 30 wherein the decoder is an exhaustive search decoder.

32. The method of claim 30 wherein the decoder is a reduced search decoder.

33. The method of claim 25 wherein the channel quality metric is the moving average metric.

34. The method of claim 25 wherein the channel quality metric is predicted from the moving average metric using a linear predictor.

35. The method of claim 34 further including the steps of generating an optimal linear predictor $h_l$, storing the optimal linear predictor $h_l$ into a memory unit; and determining future moving average metric $\tilde{M}_{i+D}$ values, for the $(i+D)^{th}$ time slot block, from the current value and (p-1) previous values of the moving average metric using the following relation $$\tilde{M}_{i+D} = \sum_{l=0}^{p-1} h_l M_{i-1}$$

where p is the order of the optimal linear predictor $h_l$, l is index that starts at zero and ends at p−1, and D represents the future time slot index.

36. The method of claim 25 wherein the step of establishing the mapping from the channel quality metric to the signal to interference plus noise ratio further includes the steps of choosing thresholds defined as $\theta_{low}$ and $\theta_{high}$ such that $\theta_{low}<1$ and $\theta_{high}>1$, and generating a table of target metric values $\mu_n$ in descending order of signal to interference plus noise for a range of interest using the following rule:

$$\mu_n = (N*E_s)/(10^{(0.1*SINR)}{}_n \text{ for } n=1, 2 \ldots K$$

where N is the number of symbols per block, $E_S$ is the energy per symbol, $SINR_n$, is the $n^{th}$ signal to interference plus noise value in the table, and K is the size of the table.

37. The method of claim 36 wherein the target metric values $\mu_n$ are the expected values of the respective channel quality metrics for each $SINR_n$.

38. The method of claim 36 wherein the thresholds $\theta_{low}$ and $\theta_{high}$ are chosen based on the standard deviation of $M_i$.

39. The method of claim 36 wherein the step of mapping the channel quality metric to the signal to interference plus noise ratio values using the rule further includes the steps of determining values $M_i/\mu_1$ by dividing said value of $M_i$ by said value of $\mu_n$, n=1, 2, . . . , K from pre-determined table of target metric values, mapping said value of $M_i$ to a maximum value of said corresponding signal to interference plus noise ration if $M_i/\mu_1$ is less than $\theta_{low}$, mapping said value of $M_i$ to a minimum value of said corresponding signal to interference plus noise ratio if $M_i/\mu_1$ is greater than $\theta_{high}$, and mapping said value of $M_i$ to said corresponding signal to interference plus noise ratio $SINR_n$ for n such that $\theta_{low}<M_i/\mu_n<\theta_{high}$.

* * * * *

UNITED STATES PATENT AND TRADEMARK OFFICE
CERTIFICATE OF CORRECTION

PATENT NO.   : 6,108,374                                        Page 1 of 2
DATED        : August 22, 2000
INVENTOR(S)  : Krishna Balachandran, Sanjiv Nanda, Srinivas R. Kadaba, Richard P. Ejzak It is certified that error appears in the above-identified patent and that said Letters Patent is hereby corrected as shown below:

Column 12,
Line 54, change "$M_i/\pm$" to --$M_i/\mu$--;
Line 55 and 62, change "$\pm$" to --$\mu$--.

Column 13,
Line 41, change "$M_i/\pm$" to --$M_i/\mu$--;
Lines 42 and 51, change "$\pm$" to --$\mu$--.

Column 14,
Line 33, change "$M_i/\pm$" to --$M_i/\mu$--;
Line 34, change "$\pm$" to --$\mu$--;
Lines 38 and 39, change "$M_i$" to --$M_I$--;
Line 40, change "oath" to --path--;
Line 41, "$\pm$" to --$\mu$--;
Line 53, change "$M_i=/\alpha M_{i-1}+(1-/\alpha)m_i$" to --$M_i=\alpha M_{i-1}+(1-\alpha)m_i$--.

Column 15,
Line 22, change "$M_i/\pm$" to --$M_i/\mu$--;
Line 23, change "$\pm$" to --$\mu$--;
Lines 27 and 28 "$M_i$" to --$M_I$--;
Lines 31, "$\pm$" to --$\mu$--;

Column 16,
Line 13, "$M_i/=\rightarrow M_{i-1}=(1-/\rightarrow)m_i$" *to* --$M_i=\alpha M_{i-1}+(1-\alpha)m_i$--;

Line 14, change "$\rightarrow$" to --$\alpha$--;

Lines 36 and 38, change "$\{\bar{a}_k\}$" to --$\{\hat{a}_k\}$--;

Line 39, change "$\{\bar{s}_k\}$" to --$\{\hat{s}_k\}$--;

UNITED STATES PATENT AND TRADEMARK OFFICE
CERTIFICATE OF CORRECTION

PATENT NO. : 6,108,374
DATED : August 22, 2000
INVENTOR(S) : Krishna Balachandran, Sanjiv Nanda, Srinivas R. Kadaba, Richard P. Ejzak It is certified that error appears in the above-identified patent and that said Letters Patent is hereby corrected as shown below:

Column 17,
Line 20, change "$\mu_n=(N*E_S)/(10^{(0.1*SINR)})_n$ for n=1,2 ... K" to
-- $\mu_n=(N*E_S)/(10^{(0.1*SINR_n)})$ for n=1,2 ... K --.

Column 18,
Line 20, change "$M_i/\mu_l$" to -- $M_i/\mu_k$ --.

Signed and Sealed this

Fourteenth Day of August, 2001

*Attest:*

*Attesting Officer*

NICHOLAS P. GODICI
*Acting Director of the United States Patent and Trademark Office*